United States Patent

[11] 3,608,584

[72] Inventor Charles W. Vaughn
 Rte. 1, Jennings, Okla. 74038
[21] Appl. No. 800,565
[22] Filed Feb. 19, 1969
[45] Patented Sept. 28, 1971

[54] FLOW CONTROL DEVICE
 7 Claims, 3 Drawing Figs.
[52] U.S. Cl. .................................................. 137/625.26
[51] Int. Cl. ...................................................... F16k 11/02
[50] Field of Search ........................................... 137/625.25,
 625.26, 625.38, 625.68; 251/325, 339

[56] References Cited
 UNITED STATES PATENTS
2,582,042 1/1952 Kiene ........................... 137/625.27
2,638,108 5/1953 Williams et al. ............. 137/625.26 X
2,823,699 2/1958 Willis ........................... 137/625.26
3,244,456 4/1966 Henricks et al. ............. 137/625.26 X
3,380,561 4/1968 Porter ........................... 251/325 X
 FOREIGN PATENTS
 224,412 8/1961 Austria ......................... 137/625.68
1,298,502 6/1962 France ......................... 137/625.68
 875,601 5/1953 Germany ..................... 137/625.26

Primary Examiner—Henry T. Klinksiek
Attorney—William S. Dorman

ABSTRACT: A valve having a reciprocal plunger or piston for providing alternate open and closed positions of the valve. The piston is slidably disposed within a housing having opposed inlet and outlet ports and may be moved in one direction for opening the valve to permit the flow of fluid therethrough. Movement of the piston in an opposite direction provides a first closed position of the valve wherein all flow through the valve is interrupted and there is no loss of fluid through the valve. Further movement of the piston in the closing direction provides a second closed position wherein flow of fluid through the valve is precluded and fluid trapped in the line or valve housing may be drained therefrom.

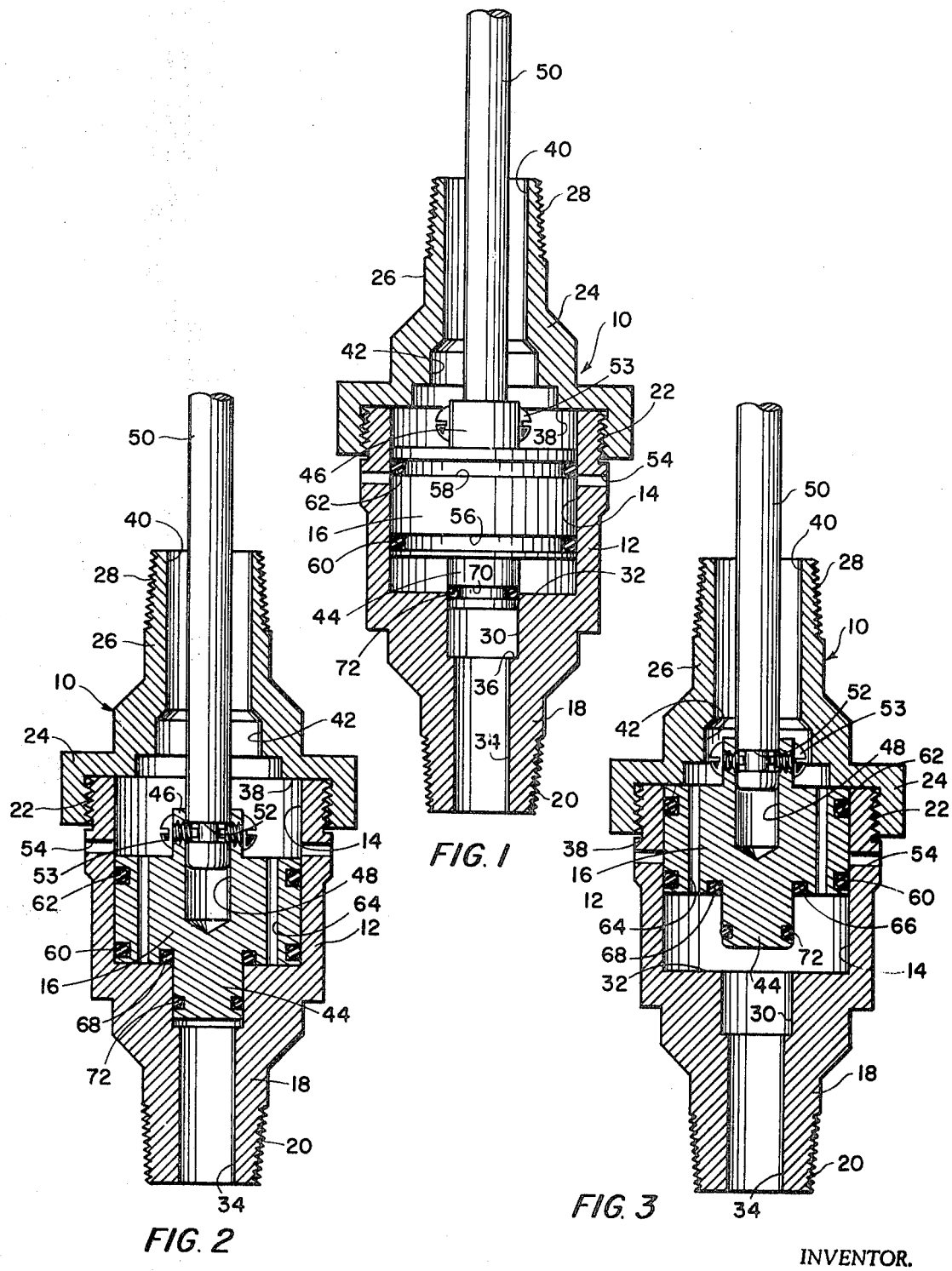

3,608,584

FLOW CONTROL DEVICE

This invention relates to improvements in flow control devices and more particularly, but not by way of limitation, to stop flow valves wherein flow of fluid may be completely interrupted or trapped fluid may be drained therethrough.

The present invention contemplates a novel valve structure of the stop flow or drain valve type wherein a control piston is reciprocally disposed within a ported valve housing which may be interposed in a flow line. Reciprocation of the piston alternately opens and closes the valve for controlling the flow of fluid therethrough. In one position of the piston within the housing, the valve is opened for permitting the free flow of fluid therethrough. The piston may be moved to a second position within the housing whereby all flow of fluid through the valve is precluded, thus providing a stop valve operation. A third position of the piston within the housing permits draining of any trapped fluid within the housing or vessel or line being controlled thereby, while simultaneously precluding the passage of additional fluid into the housing. The novel valve may be quickly and easily moved from the open to the closed positions thereof for facilitating the handling or control of the fluid moving through the valve.

It is an important object of this invention to provide a novel flow control device wherein the flow through the device may be stopped in a manner permitting draining of trapped fluid in the device or line or vessel being controlled by the device.

It is another object of this invention to provide a novel flow control device wherein flow through the device is controlled by a reciprocal piston member for facilitating operation of the device.

Another object of this invention is to provide a novel stop or drain valve which is simple and efficient in operation and economical and durable in construction.

Other and further objects and advantageous features of the present invention will hereinafter more fully appear in connection with a detailed description of the drawings in which:

FIG. 1 is a sectional elevational view of a flow control device embodying the invention and depicting the device in the full closed position thereof.

FIG. 2 is a view similar to FIG. 1 showing the device in the drain position thereof.

FIG. 3 is a view similar to FIG. 1 showing the device in the full open position thereof.

Referring to the drawings in detail, reference character 10 generally indicates a flow control device or valve adapted to be interposed in a flow line, or the like, (not shown) and comprising a body 12 having an internal bore 14 extending longitudinally therein for receiving a reciprocal plunger or piston member 16. The housing 12 is provided with a reduced neck portion 18 at one end thereof having an externally threaded portion 20 for connection with a suitable coupling member (not shown), pipe section (not shown), or the like for interposing the device 10 in the flow line as is well known. The opposite end of the housing 12 is threaded at 22 for receiving a coupling sleeve 24. The coupling sleeve 24 is provided with a reduced portion 26 having an externally threaded portion 28 for connection with a pipe section, or the like (not shown), for securing the device 10 in the flow line.

The bore 14 is reduced at 30 to provide an annular shoulder 32 which is a stop for limiting the movement of the plunger 16 in a downward direction as viewed in the drawings. The bore 30 provides a cylindrical valve seat and is further reduced at 34 to provide an annular shoulder 36. The bore 34 is open to provide a fluid inlet or outlet passageway for the housing 12.

The adapter or coupling sleeve 24 is provided with an inwardly directed annular shoulder 38 conterminous with the threaded portion 22 to provide a stop member at the open upper end of the bore 14 as viewed in the drawings. The stop 38 limits the movement of the piston 16 in the upward direction for a purpose as will be hereinafter set forth. The sleeve 24 is provided with a centrally disposed longitudinally extending bore 40 in substantial axial alignment with the bore 14 to provide a fluid inlet or outlet passageway for the device 10. The bore 40 may be enlarged at 42 to provide clearance for reciprocation of the plunger 16 as will be hereinafter set forth. The outer periphery of the piston or plunger 16 is preferably of a configuration complementary to the configuration of the bore 14 and as hereinbefore set forth is slidably disposed therein. A centrally disposed boss member 44 is provided on one end of the piston 16 and extends axially outward therefrom. A second centrally disposed axially outwardly extending boss 46 is provided on the opposite end of the piston 16 and is provided with a central bore 48 extending longitudinally into the piston 16 for receiving a stem 50 therein. The stem 50 may be secured within the bore 48 in any suitable manner, and as shown herein, the stem 50 is provided with an annular groove 52 in the proximity of one end thereof for receiving the inwardly directed end of a plurality of spaced screws 53 which extend through the walls of the boss 46 into engagement with the stem 50. The stem 50 extends through the bore 40 and into connection with any suitable device (not shown) for alternate raising and lowering or reciprocation of the stem for reciprocating the plunger 16 in the bore 14 in a manner and for a purpose as will be hereinafter set forth.

A plurality of circumferentially spaced ports 54 are provided in the sidewall of the housing 12 to provide communication between the bore 14 and the exterior of the housing 12. The length of the plunger 16 is greater than the distance between the shoulder 38 and the ports 54 as particularly shown in FIGS. 1 and 3. A pair of longitudinally spaced annular grooves 56 and 58 are provided on the outer periphery of the piston 16 for receiving suitable sealing rings 60 and 62 therein, respectively. The sealing rings 60 and 62 are spaced apart a sufficient distance for spanning the ports 54 in two operating positions of the piston 16 for a purpose and as will be herein after set forth. The sealing rings 60 and 62 bear against the periphery of the bore 14 to provide a sealing engagement therebetween.

A plurality of circumferentially spaced bores 64 extend longitudinally through the plunger 16 to provide fluid passageways therethrough. The passageways 64 are spaced radially inwardly from the shoulder 38 and radially outwardly from the boss 44 to permit free flow of fluid through the plunger 16 in the open position of the valve 10. An annular groove 66 is provided in the end of the plunger 16 surrounding the boss 44 and is interposed between the boss 44 and the open bores 64 for receiving a suitable sealing ring 68 therein. The seal 68 bears against the shoulder 32 in the full closed position of the plunger 16, as shown in FIG. 2, for precluding leakage of fluid therearound.

The boss 44 is of a size complementary to the size of the bore 30 and is slidably engageably therein upon reciprocation of the plunger 16 during operation of the valve 10. An annular groove 70 is provided around the outer periphery of the boss 44 for receiving a suitable sealing ring 72 therein. The seal member 72 engages the periphery of the bore 30 for precluding leakage of fluid therebetween.

In operation, the valve 10 may be interposed in a flow line (not shown) wherein it is desired to provide a stop flow, drain control, or other valved control of the fluid flowing therethrough. When it is preferable to provide an unimpeded flow of fluid through the valve 10, the stem 50 is raised or positioned in such a manner as to move the plunger 16 into engagement with the shoulder 38 as shown in FIG. 3. As long as the plunger 16 remains in this position, fluid may flow freely from the bore 40, through the bores 64 and into the bore 34 for discharge into the flow line (not shown). In this position of the plunger 16, the seal members 60 and 62 will be disposed on the opposite sides of the bores 54, thus sealing off the bores and precluding passage of fluid therethrough.

When it is desired to stop the flow of fluid through the valve 10 and preclude draining of any fluid which may be present in the bore 40, the stem 50 may be lowered or moved in a direction for positioning the boss 44 in the bore 30 a sufficient distance for engaging the seal member 72 with the bore 30 as shown in FIG. 1. There is a "feel" in the movement of handling of the movement of the stem 50 as the seal member 72 enters the bore 30 thus permitting the operator of the valve to ascertain when the desired position of the plunger 16 has been achieved. In this position of the plunger 16, the seal members 60 and 62 are disposed on opposite sides of the ports 54 thus precluding flow of fluid therethrough. In addition, the bore 30 is sealed by the seal member 72, and fluid passing through the bores 64 cannot enter the bore 34 for discharge from the valve 10. In this position, the valve is closed, and no fluid will drain from the bore 40.

Under operating conditions wherein it is desired to close the valve and simultaneously drain fluid from the bore 40, the stem 50 may be lowered or moved for positioning the plunger 16 against the shoulder 32 as shown in FIG. 2. In this position for the plunger 16, the ports 54 are in open communication with the bore 40 and any fluid therein may drain through the bores 54 to the exterior of the housing 12. The seal members 68 and 72 preclude communication between the passageway or bores 64 and the bore 34, thus precluding flow of fluid through the valve 10.

The seal members 60 and 62 provide a wiping action against the periphery of the bore 14 during reciprocation of the plunger 16, thus cleaning the interior of the housing 12. Similarly, the seal member 72 wipes the periphery of the bore 30 for facilitating cleaning thereof. In addition, the multiplicity of seal members provided on the plunger 16 increases the sealing efficiency in that should one of the seal members fail for any reason, the remaining seal members provide an auxiliary sealing action. All of the seal members are positive-type seals, and no pressure or liquid will be lost from the valve 10 either when the valve initially opens or closes.

The stem 50 may extend upwardly from the piston 16 through the flow line to substantially any desired position for facilitating manipulation thereof, as is well known. A suitable lever (not shown), rotatable handwheel, or the like, (not shown) may be provided for moving the stem 50 in alternate longitudinal directions within the flow line for the operation of the plunger 16 as hereinbefore set forth.

It will be apparent that the valve 10 may be utilized not only as a stop flow valve, drain valve, waste valve, or the like, but also may be utilized as a pressure relief valve. A suitable spring (not shown) may be interposed between the shoulder 38 and the piston 16 for yieldably urging the piston in a direction toward the full closed position thereof shown in FIG. 2. The force or pressure of the spring may be selected as desired in accordance with the required operating conditions, and when the pressure acting against the piston 16 through the bore 34 in an opposite direction from the spring pressure becomes greater than the force of the spring, the piston 16 will be moved away from the shoulder 32 for opening of the passageways 34. The excessive pressure in the bore 34 will thus be relieved through the bores 54, and upon a restoration of the normal pressure within the bore 34, the spring will close the plunger 16 or move the plunger 16 into position against the shoulder 32.

From the foregoing it will be apparent that the present invention provides a novel fluid control device wherein a piston or plunger member may be reciprocated within a housing to provide alternate open and closed positions for the device. In addition, an intermediate position is provided for the piston wherein flow through the device may be interrupted while permitting draining of trapped fluid from the housing. Of course, only the full open and full closed positions for the device may be provided, if desired, with a complete elimination of the intermediate drain position thereof. Furthermore, the piston member may be actuated by spring pressure, or the like, whereby the device may be utilized as a pressure relief valve. The novel fluid flow control device is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A fluid flow control device comprising a housing having an internal bore, inlet and outlet passageway means provided in communication with the bore, plunger means reciprocally disposed within the bore, fluid passageway means provided in the plunger for directing fluid therethrough, means limiting the movement of the plunger within the bore in a first direction to provide an open position therefor whereby fluid may flow freely between the inlet and outlet passageways, means cooperating between the housing and plunger to provide a second position of the plunger within the bore fully closing the valve whereby the flow of fluid between the inlet and outlet passageways is interrupted, and seal means interposed between the plunger and housing for precluding leadage of fluid therebetween, said seal means comprising an axially extending imperforate boss member provided on the plunger, and cylindrical valve seat means provided in the housing for slidably sealing receiving the boss member therein said second position of the plunger.

2. A fluid flow control device as set forth in claim 1 and including drain bore means provided in the housing, and means limiting the movement of the plunger in an opposite direction from said first direction for providing a position of the plunger within the bore whereby fluid communication between the inlet and outlet passageways is precluded and fluid is simultaneously discharged through the drain bore means.

3. A fluid flow control device as set forth in claim 2 wherein the seal means includes a pair of longitudinally spaced seal members interposed between the plunger and housing for spanning the drain bore means in the open position and second position of the plunger within the bore to preclude flow of fluid through the drain bore means.

4. A fluid flow control device as set forth in claim 1 wherein the fluid passageway means provided in the plunger comprises a plurality of circumferentially spaced bores extending longitudinally through the plunger.

5. A fluid flow control device comprising a housing having an internal bore, inlet and outlet passageway means provided in communication with the bore, plunger means reciprocally disposed within the bore, fluid passageway means provided in the plunger for directing fluid therethrough, means limiting the movement of the plunger within the bore in a first direction to provide an open position therefor whereby fluid may flow freely between the inlet and outlet passageways, means cooperating between the housing and plunger to provide a second position of the plunger within the bore whereby the flow of fluid between the inlet and outlet passageways is interrupted, and seal means interposed between the plunger and housing for precluding leakage of fluid therebetween, and including drain bore means provided in the housing, and means limiting the movement of the plunger in an opposite direction from said first direction for providing a position of the plunger within the bore whereby fluid communication between the inlet and outlet passageways is precluded and fluid is simultaneously discharged through the drain bore means, and including an axially extending boss member carried by the plunger, said internal bore of the housing being provided with a reduced portion for slidably receiving the boss member therein, and seal means interposed between the boss member and reduced bore portion for precluding leakage of fluid therebetween in the said second position of the plunger within the bore.

6. A fluid flow control device comprising a housing having an internal bore, fluid inlet and outlet passageways in communication with the bore, drain bore means provided in the housing and interposed between the inlet and outlet passageways, plunger means reciprocally disposed within the bore, fluid passageway means extending axially through the plunger means for directing the fluid therethrough, an imperforate boss member extending radially outward from on end of said plunger means, cylindrical valve seat means provided in the housing for slidably sealing receiving the boss member therein, said plunger being movable to a first position within the bore adjacent one end of the bore whereby fluid may flow freely therethrough between the inlet and outlet passageways through the passageway means, said plunger being movable to a second position within the bore whereby the boss member engages the valve seat for precluding flow of fluid between the inlet and outlet passageways, said plunger being movable to a third position within the bore adjacent the opposite end of the bore from the valve seat means whereby flow of fluid between the inlet and outlet passageways is precluded which simultaneously draining fluid through the drain bore means by gravity, and seal means interposed between the plunger and housing for precluding leadage of fluid therebetween.

7. A fluid flow control device as set forth in claim 6 wherein the seal means comprises longitudinally spaced seal members interposed between the plunger and the bore with at least one seal member being disposed on each side of the drain bore means in the first and second positions for the plunger means, and seal means interposed between the boss member and the cylindrical valve seat.